UNITED STATES PATENT OFFICE.

PHILIP L. SYLVESTER, AUBURN, NEW YORK, ASSIGNOR TO WOODRUFF BROTHERS, OF SAME PLACE.

MANUFACTURE OF BUTTONS FROM PLASTIC MATERIAL.

SPECIFICATION forming part of Letters Patent No. 232,564, dated September 21, 1880.

Application filed June 16, 1880. (Specimen.)

*To all whom it may concern:*

Be it known that I, PHILIP L. SYLVESTER, of Auburn, in the county of Cayuga, and in the State of New York, have invented certain new and useful Improvements in Manufacture of Buttons from Plastic Material, (Case A;) and I do hereby declare that the following is a full, clear, and exact description thereof.

In the manufacture of buttons from plastic material it is desirable that the outer face should present an ornamental appearance; but as the material used for such ornamentation is more expensive than the material from which the body of the button is composed, it is necessary that as little of the former should be employed as possible, in order that the cost of the finished article may not be excessive.

To obviate this difficulty is the design of my invention, which consists, as an improvement in the manufacture of buttons from plastic material, in the method of producing an ornamental surface by means of brocade, cut foil, gold-sand, or other like finely-subdivided material sprinkled upon the surface of the plastic material or within the mold, substantially as and for the purpose specified.

In the use of my method I take sheets of the plastic material for forming the body of the button and spread them upon a heated metal plate, and, when properly softened by the heat, sprinkle upon the upper side of each sheet tinsel, foil, brocade, gold-sand, or other like finely-subdivided material, after which each sheet is cut into strips and placed within the molds and subjected to pressure in the usual manner, the result being that the said surfacing material is pressed into and incorporated with the said body material, and the front of the button produced presents the same appearance as though its entire substance were mixed with said ornamental material.

If desired, the ornamental material may be sprinkled into the face-mold instead of being sprinkled upon the sheets of the material, as described.

Having thus fully set forth the nature and merits of my invention, what I claim as new is—

As an improvement in the manufacture of buttons from plastic material, the method of producing an ornamental surface by means of brocade, cut foil, gold-sand, or other like finely-subdivided material sprinkled upon the surface of the plastic material or within the mold, substantially as and for the purpose specified.

In testimony that I claim the foregoing I have hereunto set my hand this 10th day of June, 1880.

PHILIP L. SYLVESTER.

Witnesses:
   E. D. WOODRUFF,
   CLARK KNIGHT.